DIGITAL COMPLEMENT GENERATOR

Filed Oct. 6, 1964

INVENTOR.
ALLEN E. GORDON
BY
Shenier & O'Connor
ATTORNEYS

United States Patent Office 3,380,047
Patented Apr. 23, 1968

3,380,047

DIGITAL COMPLEMENT GENERATOR

Allen E. Gordon, Fairfield, Conn., assignor to United Aircraft Corporation, East Hartford, Conn., a corporation of Delaware Filed Oct. 6, 1964, Ser. No. 401,912
5 Claims. (Cl. 340—347)

ABSTRACT OF THE DISCLOSURE

A digital complement generator which permits a check of the circuitry of a noncontacting encoder in which a sensor mounted for movement with relation to spaced elements disposed along a track is energized by a reversible phase or alternating current signal so as to produce an output signal having one phase when the sensor registers with an element and having an opposite phase when the sensor registers with an interelement space. First phase-sensitive detecting means responsive to the signal and to the source provides an output only when the signals are in phase and second phase-sensitive means responsive to the signal and to the source provides an output only when the signals are out of phase. An exclusive OR circuit responsive to the two detecting means permits a check of the operation of the circuitry.

My invention relates to digital encoders, and more particularly to improved apparatus for generating a digital complement signal.

There are a large number of devices which will translate linear or angular position or motion information into an electrical code to permit the information to be processed by computing devices which require input signals in digital form. Some of these early devices employed mechanical contacts and brushes to sense a coded pattern on a strip or disk. To overcome the disadvantages of mechanical contacts, such as the inherent low speed characteristics of these sensors, and the wearing of the contacting parts, a class of non-contacting sensors has been developed. Non-contacting encoders commonly employ an oscillator which energizes a sensing head which can be of various respective constructions.

In digital encoding, irrespective of the system employed, it is often necessary to generate both the digital bit and its complement. That is, if a sensed information bit is represented by a first voltage level, and the absence of a bit is represented by a second voltage level, the complement signal produces the first voltage level in the absence of a bit and the second voltage level in the presence of a bit.

It has been suggested to use this complement signal as an error sensor, since either the digit signal or its complement, but not both, must have an output in unambiguous encoder operation for any encoder position. In non-contacting encoders of the prior art the sensor output signal generated in response to the presence of a coding element adjacent the sensor is passed through amplifying and squaring processing circuitry and possible sensor selection circuitry to produce a bit signal. This bit signal is applied to an inverter to generate the complement signal. Any effort to provide an error check by comparing the inverter output (complement signal) with the inverter input (bit signal) will result only in a check of the inverter; and malfunction of the sensor or of the processing circuitry will remain undetected.

Further, in encoders of the prior art wherein the sensors are energized by oscillators, different loads are applied to the oscillator when the sensor is in different states. Thus varying loads are applied to the oscillators in normal operation of the encoders.

There have been proposals to use sensors in pairs—one sensor to generate the information signal and the other to generate its complement. However, this arrangement is an uneconomical duplication of parts.

My invention advantageously provides an analog-to-digital encoder in which with one sensor an information signal and its complement are generated and processed through all the signal processing circuitry and separated only after the signal has been encoded. Thus, a check on the entire circuit operation is achieved.

An object of my invention is to provide an analog-to-digital encoding system which continuously generates a signal containing both bit and complement information.

Another object of my invention is to provide a digital encoder in which both the bit and the complement information are advantageously processed in the same electronic circuitry.

A further object of my invention is to provide a more uniform load on the oscillator of a non-contacting encoder sensor.

Still another object of my invention is to provide an analog-to-digital converter which encodes information in a phase-modulated form prior to processing to enable the employment of simple and reliable circuits.

Other and further objects of my invention will be apparent from the following description.

In general my invention contemplates the provision of a digital complement generator for an encoder in which I compare the sensor signal with a reference signal to produce an output signal of one phase when a sensor signal exists and of the opposite phase when no sensor signal exists. After passing the output signals through the processing circuitry I compare the phase of the resultant signal with that of a reference signal to produce an output bit signal when the resultant and reference signals are in one phase relation and to produce an output bit complement signal when the resultant and reference signals are of an opposite phase relation. Thus the bit and complement signals can be compared to check all the circuitry. Then too, the signal processing circuitry will always operate on an input so that the load on the oscillator is balanced.

In the accompanying drawings which form part of the instant specification and which are to be read in conjunction therewith and in which like reference numerals are used to indicate like parts in the various views.

Figures 1, 2:
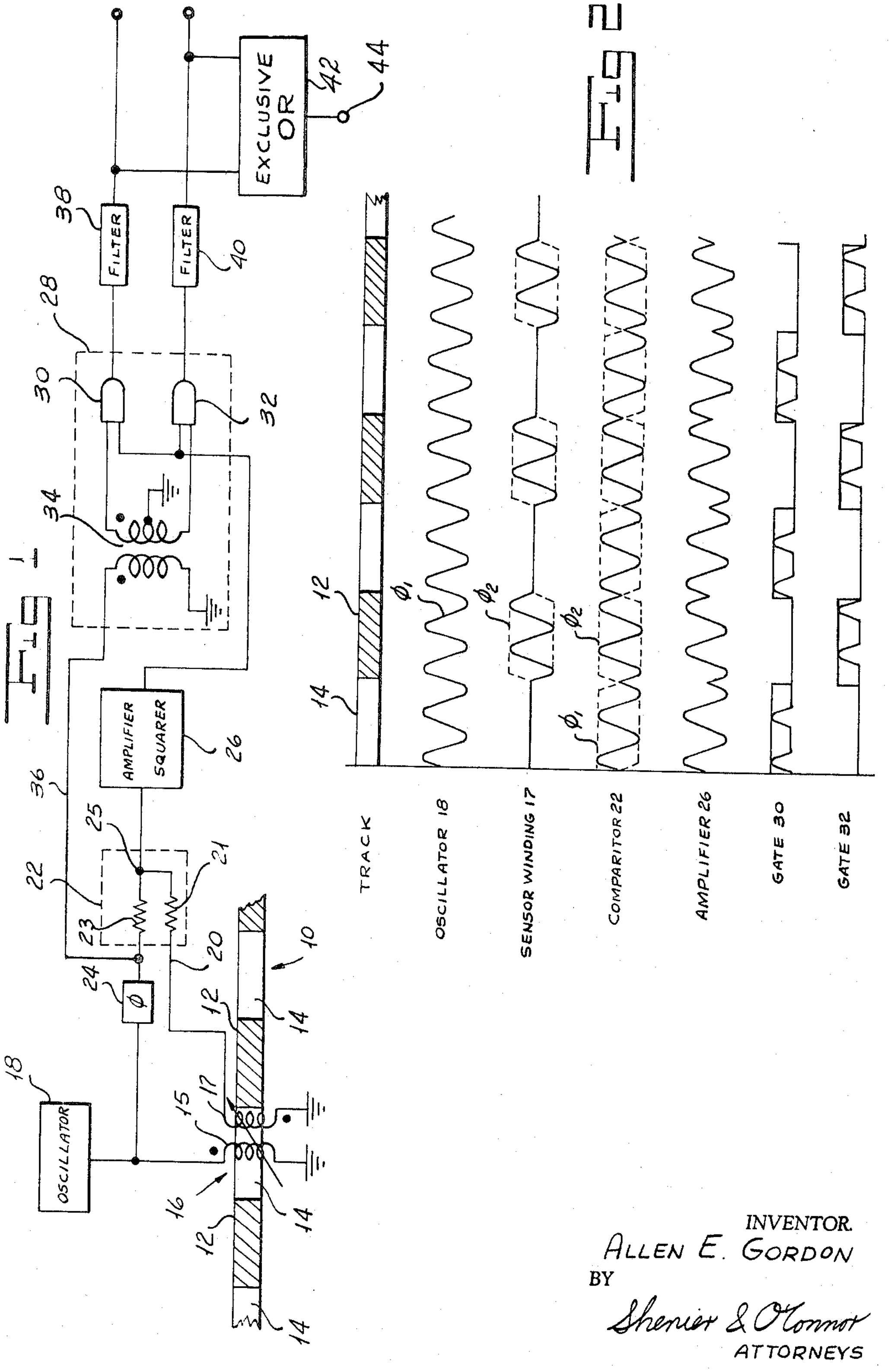
FIGURE 1 is a partial schematic diagram of one embodiment of my invention.
FIGURE 2 illustrates the waveforms at various points in the embodiment of FIGURE 1.

More particularly, referring now to the drawings, FIGURE 1 shows a code track 10 having, for example, a series of areas of detectable material representing digit bits 12 and spaces 14 separating the areas. To read the bits on the track 10, I show by way of example, a variable reluctance sensor indicated generally by the reference numeral 16 having an input winding 15 and an output winding 17. An oscillator 18, as is known in the art, is connected to the positive polarity terminal of winding 15. The positive polarty terminal of winding 17 is grounded. Conveniently, the sensor 16 has a one to one turns ratio. The comparator 22 comprises a first summing resistor 21 and a second summing resistor 23. The digit bits on the code track affect the sensor 16 and cause the coupling of the oscillator signal to an output line 20. The output of sensor 16, from its winding 17 is represented in FIGURE 2. The code track is diagrammatically shown in FIGURE 2 with relation to the waveforms at various points in the circuit. This waveform is idealized, and in practice the A.C. output of sensor 16 may never actually go to zero. However, in the absence of a bit on the code track the output signal approaches zero, and for practical purposes I will consider that the sensor has an output only when a bit is sensed.

In accordance with my invention, before the signal from sensor 16 is processed to convert it to a pulsed digital output, it is compared with a reference signal from oscillator 18 in comparator 22. If there is an output signal from sensor 16, the output of comparator 22 is of a one phase $\phi_2$. If the sensor is adjacent a space 14 the output signal from the comparator will be of opposite phase $\phi_1$. This is accomplished in the embodiment of FIGURE 1 by the polarity of the windings 15 and 17 of the sensor 16 and the values of the resistances of the comparator 22. For example, when there is no output signal from sensor winding 17, the only input to comparator 22 is from oscillator 18. The output of comparator 22 in this case is a signal in phase with oscillator 18 having a magnitude equal to the oscillator signal less the IR drop in resistor 23. When there is an input to comparator 22 from sensor winding 17, the input is, since it is derived from oscillator 18, the same frequency as oscillator 18, but 180° out of phase therewith because of the polarity of the sensor windings 15 and 17, as previously described. By properly proportioning the summing resistors 23 and 21, I advantageously make the magnitude of the signal from sensor winding 17 twice that of the continuous signal from oscillator 18 at the summing point 25. When the two out of phase signals from oscillator 18 and winding 17 are added, their magnitudes subtract. The output of comparator 22 is, when both inputs are present, a signal equal in magnitude and frequency to the output when no signal is sensed, but 180° out of phase therewith. When there is no output from winding 17 of sensor 16, the output of comparator 22 is in phase $\phi_1$ with output of oscillator 18, and when there is an output from sensor 16, the output of comparator 22 is out of phase $\phi_2$ with the output of oscillator 18. It has been assumed that the output of sensor 16 is 180° out of phase with the output signal of oscillator 18. Where this is not exactly the case, I can make an adjustment with phase shifter 24 which applies a compensating phase shift to the reference voltage from oscillator 18 so that the inputs to comparator 22 are in phase opposition.

The output from the comparator 22 is then fed to the signal processing circuitry, which may comprise, for example, an amplifier-limiter or amplifier-squarer 26. The output of amplifier-limiter 26 is a substantially uniform A.C. signal with the information contained in the phase of a signal $\phi_1$ or $\phi_2$.

I apply the output of amplifier 26 to a phase discriminator 28 which separates the signals into the digit bit and its complement. Phase discriminator 28 can be of any design known to the art, and in the illustrative embodiment of FIGURE 1, I have shown a simple discriminator consisting of two "AND" gates 30 and 32 with one input to each from one side of the center-tapped secondary of transformer 34 and the other input from amplifier 26. A reference signal from oscillator 18 is applied to the primary of transformer 34 by conductor 36.

When the output of amplifier 26 is in phase with reference signal applied to the primary of transformer 34, gate 30 conducts producing a digital output as shown in FIGURE 2, which is filtered with filter 38 to remove the A.C. component, and produce the complement output. When the output of amplifier 26 and the reference signal on the primary of transformer 34 are out of phase, gate 32 conducts producing the digit A.C. output, as shown in FIGURE 2. This output is filtered in a filter 40 to produce the digit output.

In order to check the system for error, the digit and its complement are applied to an exclusive OR circuit 42 providing an error indicating output at terminal 44 only if the outputs of filters 38 and 40 are the same. When there is no output from either filter 38 or filter 40, or when these outputs are the same, the OR circuit 42 will produce an output at terminal 44 indicating a malfunction.

To summarize, a signal from oscillator 18 is continuously applied to comparator 22 as a reference signal. In the absence of a signal from sensor 16, comparator 22 has an output of a first phase $\phi_1$ which is amplified and shaped. This signal then is detected in phase sensitive detector 28 to produce an output in the complement channel. When a code bit on track 10 is adjacent sensor 16, an output on winding 17, applied to comparator 22, causes the output signal of comparator 22 to change phase. When a signal at this second phase is detected in phase sensitive detector 28 it produces an output in the digit channel.

Thus I have accomplished the objects of my invention. My encoding system continuously generates either an information signal or its complement which is applied as an input to the signal processing circuitry. Both signals are processed in the same circuitry. The information is contained in the phase of the signal which permits relatively uncomplex discrimination and detection circuitry. Also, the oscillator load has been made more uniform.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In an encoder, a member carrying a plurality of spaced elements disposed along a track, an element sensor positioned adjacent the track, a source of alternating current, means comprising the source for exciting the sensor, means responsive to the sensor for providing a reversible phase alternating current signal having one phase when the sensor registers with an element and having an opposite phase when the sensor registers with an interelement space, first phase-sensitive detecting means responsive to the signal and to the source for providing an output only when the signal and the source are in phase and second phase-sensitive detecting means responsive to the signal and to the source for providing an output only when the signal and the source are out of phase.

2. In an encoder as in claim 1, an exclusive OR circuit responsive to the first and to the second detecting means.

3. In an encoder as in claim 1 in which the sensor provides a variable amplitude output of constant phase and in which the signal producing means comprises a summing circuit responsive to said sensor output and to the source.

4. In an encoder as in claim 1 in which one of said detecting means comprises a phase sensitive detector, means coupling the signal to the detector and means coupling the source to the detector, one of said coupling means comprising a phase inverting device.

5. In an encoder as in claim 1 wherein said signal providing means comprises an amplifying limiter.

References Cited

UNITED STATES PATENTS

| | | | |
|---|---|---|---|
| 2,537,427 | 1/1951 | Seid et al. | 340—347 |
| 2,974,316 | 3/1961 | Guidal et al. | 340—347 |
| 3,047,855 | 7/1962 | Wolinsky | 340—347 |
| 3,123,818 | 3/1964 | Steele | 340—347 |
| 3,176,241 | 3/1965 | Hogan et al. | 340—347 |
| 3,209,348 | 9/1965 | Webb | 340—347 |
| 3,219,995 | 11/1965 | Josey | 340—347 |
| 3,242,478 | 3/1966 | Kaestner | 340—347 |

MAYNARD R. WILBUR, *Primary Examiner.*

DARYL W. COOK, *Examiner.*

W. J. KOPACZ, *Assistant Examiner.*